United States Patent [19]
Gross

[11] Patent Number: 5,731,894
[45] Date of Patent: Mar. 24, 1998

[54] MULTI-PURPOSE MICROSCOPE OBJECTIVE

[76] Inventor: Leo Gross, 220 E. 67th St., New York, N.Y. 10021

[21] Appl. No.: 574,780

[22] Filed: Dec. 19, 1995

[51] Int. Cl.[6] .......................... G02B 21/06; G02B 21/00
[52] U.S. Cl. .......................... 359/386; 359/368; 359/371
[58] Field of Search .......................... 359/370, 371, 359/372, 386, 387, 889

[56] References Cited

U.S. PATENT DOCUMENTS

| | | | |
|---|---|---|---|
| 2,427,689 | 8/1947 | Osterberg et al. | |
| 2,637,243 | 5/1953 | Marx | 359/370 |
| 2,732,759 | 1/1956 | Osterberg | 359/370 |
| 4,062,619 | 12/1977 | Hoffman | 359/370 |
| 4,200,354 | 4/1980 | Hoffman | 359/370 |
| 4,255,014 | 3/1981 | Ellis | 359/371 |
| 4,407,569 | 10/1983 | Piller et al. | 359/370 |
| 4,761,066 | 8/1988 | Carter | 359/371 |
| 5,009,488 | 4/1991 | Fay et al. | 359/889 |
| 5,018,851 | 5/1991 | Matsumura | 351/214 |

FOREIGN PATENT DOCUMENTS 636168  9/1936  Germany.

OTHER PUBLICATIONS

Modulation Contrast Microscope, May 1975/vol. 14, No. 5/Applied Optics, pp. 1169–1176.

Primary Examiner—Paul M. Dzierzynski
Assistant Examiner—Mark A. Robinson
Attorney, Agent, or Firm—Lackenbach Siegel Marzullo Aronson & Greenspan, P.C.

[57] ABSTRACT

A multi-purpose objective for use in a compound microscope wherein the microscope has an eyepiece and a multi-purpose processing element in the back focal plane or Fourier plane of the objective and an aperture or slit for the light source situated in the front focal plane or conjugate Fourier plane of the condenser. An aperture specimen stage is disposed between the condenser and objective lenses. The multi-purpose light processing element has a plurality of light processing regions upon a selected region of which the image of the aperture slit is formed. The aperture element is moveable relative to the multi-purpose light processing element so as to direct light onto the selected region of the multi-purpose processing element. By directing the light illuminating the specimen onto the selected area of the multi-processing plate or element, the image selected of the specimen can be viewed in any mode such as, phase contrast, modulation contrast, colored images similar to a differential interference contrast, bright field images, dark field images and stereo imagery.

7 Claims, 2 Drawing Sheets

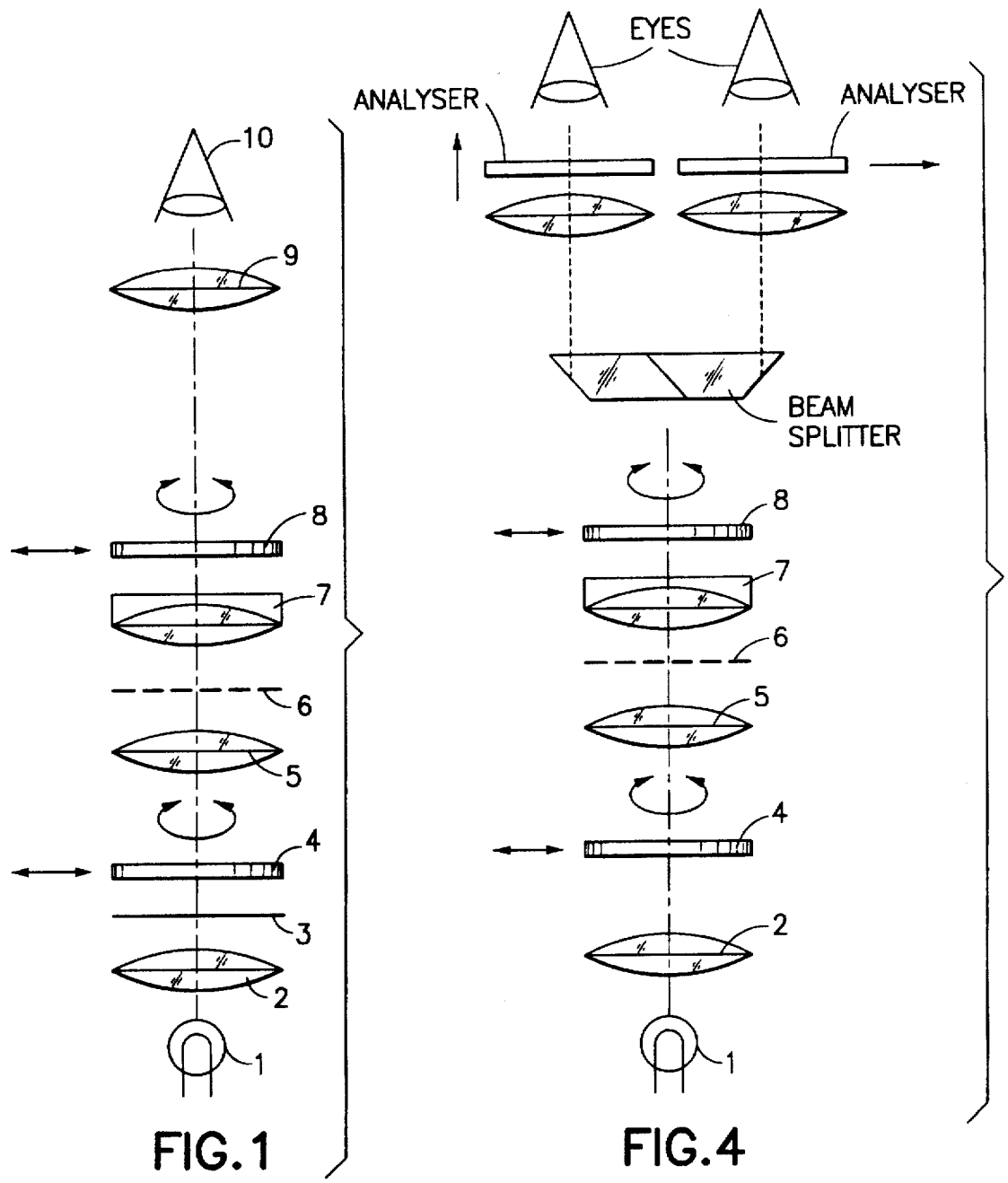

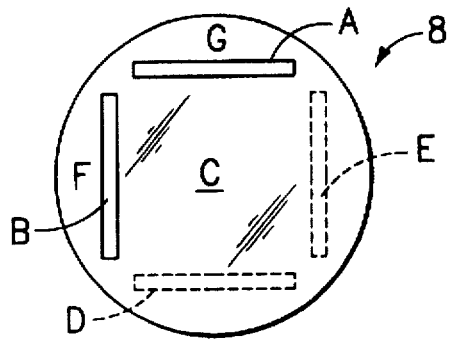
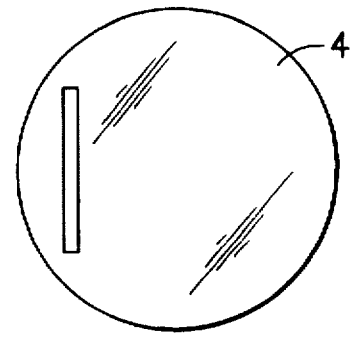
FIG.3A  FIG.2
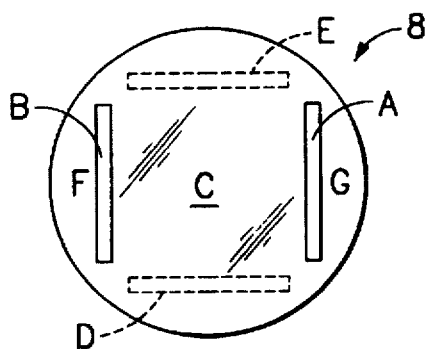
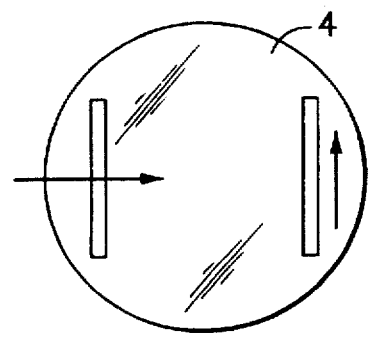
FIG.3B  FIG.5
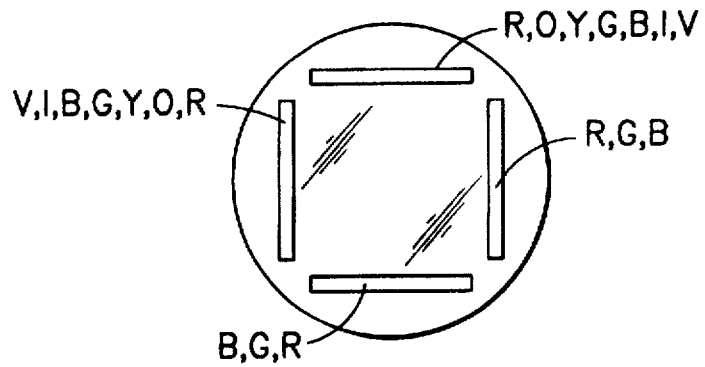
FIG.6

MULTI-PURPOSE MICROSCOPE OBJECTIVE

BACKGROUND OF THE INVENTION

This invention relates to my Disclosure Document 369545, filed in the U.S. Patent Office on Feb. 13, 1995, and I hereby request the Patent Office to retain such disclosure document in its files and not to destroy same after two years have elapsed since its filing. In addition, I hereby incorporate by reference all of the information included in such disclosure document by attaching a copy of same to this patent application as an Appendix (pages I and II).

As is well known, when Zernike invented the phase contrast microscope which employs a phase plate in the early 1930's (see German Patent No. 636168, granted to Zeiss, F. Zernike, Physica 686,674, 1942 and Osterberg et al., U.S. Pat. No. 2,427,689, he had experimented with several different designs for the illuminating aperture. Zernike chose, from among a cross, a slit and others, the annulus that is now used in all phase contrast microscopes. This choice was dictated by the desire to obtain more illumination over a larger area from the weak microscope lamps available at that time.

The annulus source of illumination in the front focal plane of the microscope's condenser lens requires a matching annular phase ring in the back focal plane of the objective. This phase plate has two deleterious consequences, namely, it reduces the effective aperture of the objective lowering the resolution; and it clouds the image, were the objective used as a bright field objective. As a consequence thereof, phase contrast microscopes are usually sold with two sets of objectives, one for bright field and the other a phase contrast set.

On the other hand, Robert Hoffman's invention of the modulation contrast microscope (Applied Optics, 14: 1169, 1975; (see the Hoffman U.S. Pat. No. 4,200,353, granted on Apr. 29, 1980) which processed the image with a slit in the front focal plane of the objective lens and with a light absorbing matching region, the modulator, in the back focal plane. To insure the use of the full aperture of the objective lens for maximum resolution, the illuminating slit is placed at the edge of the field of view.

Both types of the aforementioned microscopes convert phase differences into intensity changes bringing into view features of transparent objects. The phase contrast microscope is sensitive to small changes in phase, thus revealing minute differences in light path in microscopic structures. However, abrupt changes in the refractive index at structural boundaries causes halos in the image. To minimize halos to some degree, the annular phase plate has, in addition to the phase shift, a light absorption of 75–90%. The light absorption area in the back focal plane of the objective of the modulation contrast microscope absorbs approximately the same amount of light as in the phase contrast microscope. Its location at one edge of the image aperture throws the negative spatial frequencies out of the field of view providing an image in perspective.

SUMMARY OF THE INVENTION

This invention is a multi-purpose objective for use in a compound microscope, which objective has the capability to image not only phase contrast, but modulation contrast, as well as provide colored images similar to differential interference contrast (DIC), bright field viewing, dark field viewing, three dimensional viewing and the preparation of stereo pairs of a specimen for full three dimensional appearance and measurement. Such a wide range of imaging through a single objective is unique and highly advantageous when viewing a microscopic specimen to elucidate the desired detail.

Also, such one multi-purpose objective is less costly than presently available separate objectives to accomplish all of such above-noted methods of viewing microscopical phase specimens or stained specimens. When used in its phase contrast mode, the invention has better resolving power since the full aperture of the multi-purpose objective is available for image formation which is not the case for presently available phase contrast microscope objective.

Furthermore, when the illuminated slit in the front focal plane of the condenser is moved to place its image in the back focal plane of the objective just outside of the field of view of the multi-purpose objective, excellent dark field imaging results. Dark field imaging with the multi-purpose objective of this invention will show more features than presently available dark field objectives since the illumination can be directed tangent to any position outside of the complete circle of the field of view. Specimen features that are illuminated from different directions show up in different perspectives revealing more structures than are visible with presently available dark field objectives.

In addition, with the device of the invention, when the specimen is photographed with the slit in diagonally opposite positions, a stereo pair is created. These views of the specimen extend the limits of vertical resolution not available with other methods of viewing microscopic objects.

With the multi-purpose objective retrofitted or replaced in any presently used microscope objective; and with an adjustable slit placed in the front focal plane of the condenser or placed in the same location as the phase annulus is placed in existing phase contrast microscopes, the multi-purpose objective is fully operable in any compound microscope which is reconstructed in such a manner.

The illuminating slit is located in the Fourier transform plane conjugate to the location of the phase altering region in the phase contrast microscope, or the modulator in the modulation contrast objective.

When modulation contrast is desired, the image of the illuminating slit is brought to register on the modulation contrast area by rotating and positioning the slit in the same manner as a phase annulus is brought into registration with the phase shifting region in the objective (see Robert Hoffman & Leo Gross, Modulation Contrast Microscope, Applied Optics 14: 1169, 1975). Optical gradients in the specimen have directionality, and gradients in other directions can be made evident by rotating the multi-purpose objective to effect registration and readjusting the slit.

With the insertion of color filters over the illuminating slit, the modulation contrast image will display colors similar to differential interference contrast (DIC). By choosing an appropriate color filter, the colors of adjacent microscopic structures in the specimen can be emphasized, a feature not available with differential interference contrast. Similarly, for phase contrast, the phase altering region, the phase contrast area, at the edge of the objective Fourier plane, is brought into registration with the illumination by suitably rotating the multi-purpose objective of the invention.

For dark field, the image of the illuminating slit is placed outside of the field of view. For a particular specimen, the desired structure will reveal more detail with the slit positioned at a selected tangent just outside the field of view.

To photograph stereo pairs, the slit is moved from one position to a diagonally opposite position in the field of view. Existing objectives rarely permit rotation of the objective lens elements, in the screw mounting on microscopes. The multi-purpose objective permits registration of the slit image in the desired region of the objective Fourier plane by providing rotational capabilities to the barrel of the multi-purpose objective.

With additional components, the multi-purpose objective can show a 3-dimensional view to the observer directly. In such an arrangement, the single illuminating slit is replaced with a disk containing two slits situated parallel and diagonally opposite and at the edges of the field of view. Each slit has a polarizer and the direction of polarization of one slit is perpendicular to the direction of polarization of the other slit. Analyzers mounted on each of the eyepieces of a binocular microscope are set to pass the light from only one slit. With polarized light, the view in one direction is directed to one eyepiece while light polarized at right angles from the other slit images the specimen to the other eyepiece.

BRIEF DESCRIPTION OF THE DRAWINGS

FIG. 1 shows diagrammatically the location or order of the optical elements in a compound microscope along the optical axis thereof, and indicating the positioning of the unique multi-purpose objective, more particularly the optical multi-purpose light processing element;

FIG. 2 shows in plan view the design of the illuminated aperture element, which is preferably in the form of a slit in the Fourier plane of the condenser lens, with the image of the slit being processed optically by the device in FIG. 3;

FIGS. 3a and 3b show two forms of construction of the optical multi-purpose processing element of the multi-purpose objective of the invention;

FIG. 4 shows diagrammatically the configuration or order of the optical elements for use in an alternate construction, such as may be used for real time stereo viewing;

FIG. 5 shows in plan view the aperture element of FIG. 4 having a pair of illuminated slits used for stereo viewing; and FIG. 6 is one of many configurations of a multiple filter disk having a plurality of colored filters for producing colored images similar to differential interference contrast.

DESCRIPTION OF THE PREFERRED EMBODIMENTS

The elements or components of the compound microscope shown in FIG. 1 are identified by the following reference numerals.

1—Light source
2—Light concentrating Lens
3—Polarizer
4—Aperture Slit (illuminated by light)
5—Condenser Lens
6—Specimen
7—Objective Lens
8—Multi-purpose light image processing element or plate
9—Eyepiece
10—Eye As shown in the drawings, and more particularly in FIGS. 1-2 and 4-5, all elements or components of the microscope, but item 4—the illuminating slit and item 8—the multipurpose image processing element are conventional components of a typical compound microscope. The illuminating slit 4, situated before the condenser, is placed in my new and improved microscope in the focal plane, the front Fourier plane conjugate to the Fourier plane in back of the multi-purpose objective. An image of the slit is formed in the back of the objective, the conjugate Fourier plane; and the multi-purpose optical processing plate 8, is the element that converts the objective to a multi-purpose objective.

The aperture slit 4 is mounted in an adjustable holder, providing means to position the slit for its image to fall on the designated regions of the multi-purpose light processing element 8, or alternately so that it can be moved far enough from the optical axis to cause its image to lie outside of the field of view in the conjugate Fourier plane above the multi-purpose objective. It will be appreciated that the slit assembly is similar to those found in the condenser turret in phase contrast microscopes or the similar turret in modulation contrast microscopes for objectives with different magnifications. More lateral slit motion is provided with the invention to allow the image of the slit to fall outside of the field of view. The slit is uniformly illuminated by the light concentrating lens 2. The slit length subtends approximately 45 degrees of arc, and the slit width is approximately 1/10 the diameter of the field of view. The slit is oriented to the edge of the field of view with its ends touching the perimeter of the field of view. Alternatively, for dark field viewing, the image of the slit is moved outside of the field of view.

The multi-purpose processing element 8 and the aperture element 4 are suitably movable relative to each other so as direct light through the compound microscope in a desired manner. The multi-purpose objective is further rotatably mounted by any suitable means about the optical axis of the microscope as well.

The image of the slit is formed in the Fourier plane above the multi-purpose objective as previously described. The slit is adjusted for its image to fall on and be conjugate to the selected region of the multi-purpose image processing plate. When the slit is rotated and brought into registration with the ¼ wave phase shifting region A, a phase contrast image is formed and made visible in the eyepiece. The phase shifting region is positioned close to one edge of the field of view, as best shown in the drawings of two possible configurations of the multi-processing element (FIGS. 3a and 3b).

The dotted lines in said figures are representative of the images of the slit on the image processing plate of the invention.

Since the slit is situated to the side of the field of view, the phase contrast image lacks negative spatial frequencies. This enhances the appearance of slight optical refractive index gradients in the transparent specimen. Since the field of view is not encumbered by a phase annulus as in conventional phase microscopes, the same multi-purpose objective is used for bright field viewing when the illumination does not pass through the phase shifting region, but falls in regions C, D, or E.

However, to see a modulation contrast image, the image of the illuminating slit is brought into registration with the modulation contrast region B.

The differential interference microscope reveals an image in perspective almost the same as a modulation contrast image when set to the black and white region of the interference spectrum. With further adjustment, the differential interference image appears colored. Though microscopic structures are resolved better in the black and white region, observers favor the colored images since the eye can distinguish color differences more readily than different shades of gray. By adding color filters in proximity to the illuminating slit, such features of a differential interference contrast microsoope is obtained by the multi-purpose objective of the present invention.

To obtain a colored image, a filter is thus suitably placed over and congruent and in contact with the illuminating slit. In particular, the filter is a color spectral filter comprising all the visible colors in a band from violet to red. In the absence of an object in the specimen plane, the field of view at the eyepiece is filled with white light. When a specimen is viewed in modulation contrast, phase gradients deflect light out of the image of the slit in the Fourier plane in the back of the multi-purpose objective. This produces a colored image of the object with the colors of the spectrum directly related to the sharpness of the phase gradients. A viewer, using the improved microscope embodying the inventive features as set forth herein can select the color of specific regions of the specimen by choosing the color filter to use in the illuminated slit. When red is the color nearer the edge of the field of view, sharp phase gradients will appear blue. When blue is the color of the spectrum nearer the edge, sharp phase gradients will appear red. A filter of three bands, red, green and blue will also provide the same appearance as a full filter but without fewer color differences in the viewed image. Since the human eye is more sensitive to color differences than gradations of gray, smaller features of the microscopic specimen can be revealed when viewed under color sensitive imaging.

The colors revealed in the specimen are similar to the colored images produced by differential interference contrast (DIC) microscopy. This method of revealing specimen features can be more versatile than the colored images seen with differential interference contrast in that the color of the feature in the specimen can be selected by the viewer. One way of accomplishing this is with a color filter plate containing several different color fields that can be brought into registration with the illuminated slit as is best shown in FIG. 6. Rotation of the filter disk will bring successive colored filter regions over the slit until the desired colored image is obtained. This method of coloring image features can be done with inexpensive long working distance objectives. Long working distance differential interference objectives are quite expensive. The color filter plate is suitably disposed when employed immediately above the illuminated slit 4. When rotated into position region A has colors along the length at the slit from left to right from violet to red; and Region B has colors from right to left of red to violet. Regions C and D have the three primary colors red, green and blue in any desired order; and region E has colors from left to right of the entire spectrum in any desired order. Color filter choices other than these can be chosen to emphasize particular features of the specimen under observation.

Also, for bright field observation of the specimen, the images of the illuminated slit is located anywhere in the clear region C, of the multi-purpose optical light processing element shown in FIGS. 3 (a and/or b).

To obtain photographic stereo pair images of the specimen (see FIGS. 4 and 5), the illuminating slit image is adjusted to fall in regions D or E, of the multi-purpose objective. A photograph is then taken. The multi-purpose objective is rotated 180 degrees and the slit image is adjusted to fall on the same region of the image processing plate, now at the opposite end of the diameter. Another photograph is then taken. The resulting two photographs form a stereo pair which when viewed through a stereo-opticon will reveal structures in 3 dimensional appearance. The stereo pair may be made either a bright field image or with modulation contrast imaging.

With additional components, the improved compound microscope of the present invention becomes a stereo microscope for direct viewing as best shown in FIGS. 4 and 5. The illuminating slit is replaced by a plate with two slits. Each slit is suitably provided with a pivotably polarizer across it, one slit is polarized at right angles to the other, as shown in FIG. 5 with arrowheads. Analyzers are mounted on each eyepiece of the binocular pair adjusted to pass light from the slit on the same side as the matching slit. Thus, viewing images with stereoscopic vision combines polarization separation of images and switching light through the binocular eyepieces with light, from either one of two slits placed at opposite sides of the field of view of the Fourier planes and, polarized at right angles to each other.

For dark field imaging, the slit is positioned so that the slit image in the Fourier plane is moved outside of the field of view.

As shown in FIGS. 3a and 3b, regions F and G are suitably coated with a light absorbing film to decrease the intensity of the incident light by 90% or more. Region F removes negative spatial frequencies that can diminish the perspective appearance of modulation contrast images. Region G has the same effect on phase contrast images enhancing the appearance of these images.

A characteristic of phase and modulation contrast images is increased brightness in regions of high phase gradients. Halo is controlled in modulation contrast by introducing light from an area outside the illuminating slit. This light can be controlled by a polarizing film below the slit and an analyzer over a small region of the multi-purpose light processing element.

The foregoing description of the specific embodiments will so fully reveal the general nature of the invention that others can, by applying current knowledge, readily modify and/or adapt for various applications such specific embodiments without departing from the generic concept and therefore, such adaptations and modifications should and are intended to be comprehended within the meaning and range of equivalents of the disclosed embodiments. It is to be understood that the phraseology or terminology employed herein is for the purpose of description and not of limitation.

What is claimed:

1. A multi-purpose objective in combination, with a compound microscope, wherein said microscope having a pair of eyepieces and an aperture element in the front focal plane of a condenser lens, and having an aperture specimen stage disposed between said condenser lens and an objective lens along an optical axis of said microscope; and said multi-purpose objective comprising a multi-purpose light processing element, with a plurality of viewing regions, in the Fourier plane of the objective and with said multi-purpose light processing element and said aperture element being movable relative to each other so as to direct light from a light source through said microscope in a desired manner; whereby an image of said aperture element may be positioned on a predetermined region of said multi-purpose light processing element for forming an image selected from the group consisting of modulation contrast images, phase contrast images, colored images similar to a differential interference contrast, bright field images, dark field images and stereo imagery and wherein said aperture element is a double slit with each slit having a polarizer, and being illuminated by said light source; one of said slits transmitting light polarized at right angles to the other of said slits; and with said compound microscope further having analyzers over each eyepiece, for passing light from only one slit, whereby an image viewed combines polarization separation of images and switching light through said eyepieces with light, from either one of the slits which are disposed at opposite sides of the image field of the Fourier plane and, polarized at right angles to each other for providing three dimensional stereo images.

2. The multi-purpose objective according to claim 1, wherein said aperture element is rotatable in said microscope, whereby said aperture element is positioned so as to enable said aperture image to fall on a back focal Fourier plane of said multi-purpose objective where said multi purpose light processing element is disposed.

3. The multi-purpose objective according to claim 1, wherein said microscope produce an image of said aperture element in the back Fourier plane of said multi-purpose processing objective, and said image being capable of alignment by said aperture element so as to fall on any region of said multi-purpose processing element.

4. The multi-purpose objective according to claim 3, further including a spectral filter having all of the spectral colors from red to violet.

5. The multi-purpose objective according to claim 3, wherein said spectral filter is congruent to and above said aperture element but with the spectral colors in a reverse order from violet to red.

6. The multi-purpose objective according to claim 4, wherein said spectral filter being disposed over and at least congruent with said aperture element.

7. The multi-purpose objective according to claim 1, wherein said aperture element is translatable in said microscope, whereby said aperture element is positioned so as to enable said aperture image to fall on a back focal Fourier plane of said multi-purpose objective where said multi-purpose light processing element is disposed.

* * * * *